(12) United States Patent
Breisch (10) Patent No.: US 10,300,936 B2
(45) Date of Patent: May 28, 2019

(54) TAMPER CART SYSTEM

(71) Applicant: Lloyd Breisch, Danville, PA (US)

(72) Inventor: Lloyd Breisch, Danville, PA (US)

(*) Notice: Subject to any disclaimer, the term of this patent is extended or adjusted under 35 U.S.C. 154(b) by 282 days.

(21) Appl. No.: 15/334,927

(22) Filed: Oct. 26, 2016

(65) Prior Publication Data
US 2018/0112362 A1 Apr. 26, 2018

(51) Int. Cl.
| | |
|---|---|
| *E01B 27/14* | (2006.01) |
| *B62B 5/00* | (2006.01) |
| *E01C 19/35* | (2006.01) |
| *E01B 27/16* | (2006.01) |
| *E02D 3/046* | (2006.01) |

(52) U.S. Cl.
CPC ............ *B62B 5/0083* (2013.01); *E01B 27/14* (2013.01); *E01B 27/16* (2013.01); *E01C 19/35* (2013.01); *E02D 3/046* (2013.01); *E01B 2203/12* (2013.01)

(58) Field of Classification Search
CPC ...... E01B 27/14; E01B 27/16; E01B 2203/12; B62B 5/0083
USPC ..................................................... 104/10–14
See application file for complete search history.

(56) References Cited

U.S. PATENT DOCUMENTS

| | | | | |
|---|---|---|---|---|
| 1,713,340 | A | * 5/1929 | Jackson | E01B 27/16 104/12 |
| 1,715,131 | A | * 5/1929 | Jackson | E01B 27/16 104/12 |
| 2,659,583 | A | 11/1953 | Dorkins | |
| 3,099,225 | A | * 7/1963 | Derler | E01B 27/16 104/12 |
| 4,398,737 | A | 8/1983 | Harding | |
| 5,232,233 | A | 8/1993 | Fedora | |
| D340,563 | S | 10/1993 | Kean et al. | |
| 5,340,233 | A | * 8/1994 | Motl | E02D 3/02 104/14 |
| 6,059,299 | A | 5/2000 | Rust | |
| 6,347,907 | B1 | 2/2002 | Halstead | |
| 8,128,105 | B2 | 3/2012 | Filiatrault | |
| 2007/0187915 | A1 | 8/2007 | Filiatrault | |
| 2008/0066819 | A1* | 3/2008 | Attanasio | B62B 5/0083 137/899 |
| 2008/0143150 | A1* | 6/2008 | Doerflinger | B60T 7/102 296/204 |

* cited by examiner

Primary Examiner — Zachary L Kuhfuss (57) ABSTRACT

A tamper cart system for transporting a mechanical tamper includes a mechanical tamper. The mechanical tamper has a handle, a body and a compression plate. A cart is provided and the cart is rolled along a support surface. The mechanical tamper is selectively positioned on the cart. Thus, the mechanical tamper is transportable by an individual. A handle is movably coupled to the cart.

16 Claims, 5 Drawing Sheets

TAMPER CART SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to cart devices and more particularly pertains to a new cart device for transporting a mechanical tamper.

BRIEF SUMMARY OF THE INVENTION

An embodiment of the disclosure meets the needs presented above by generally comprising a mechanical tamper. The mechanical tamper has a handle, a body and a compression plate. A cart is provided and the cart is rolled along a support surface. The mechanical tamper is selectively positioned on the cart. Thus, the mechanical tamper is transportable by an individual. A handle is movably coupled to the cart.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
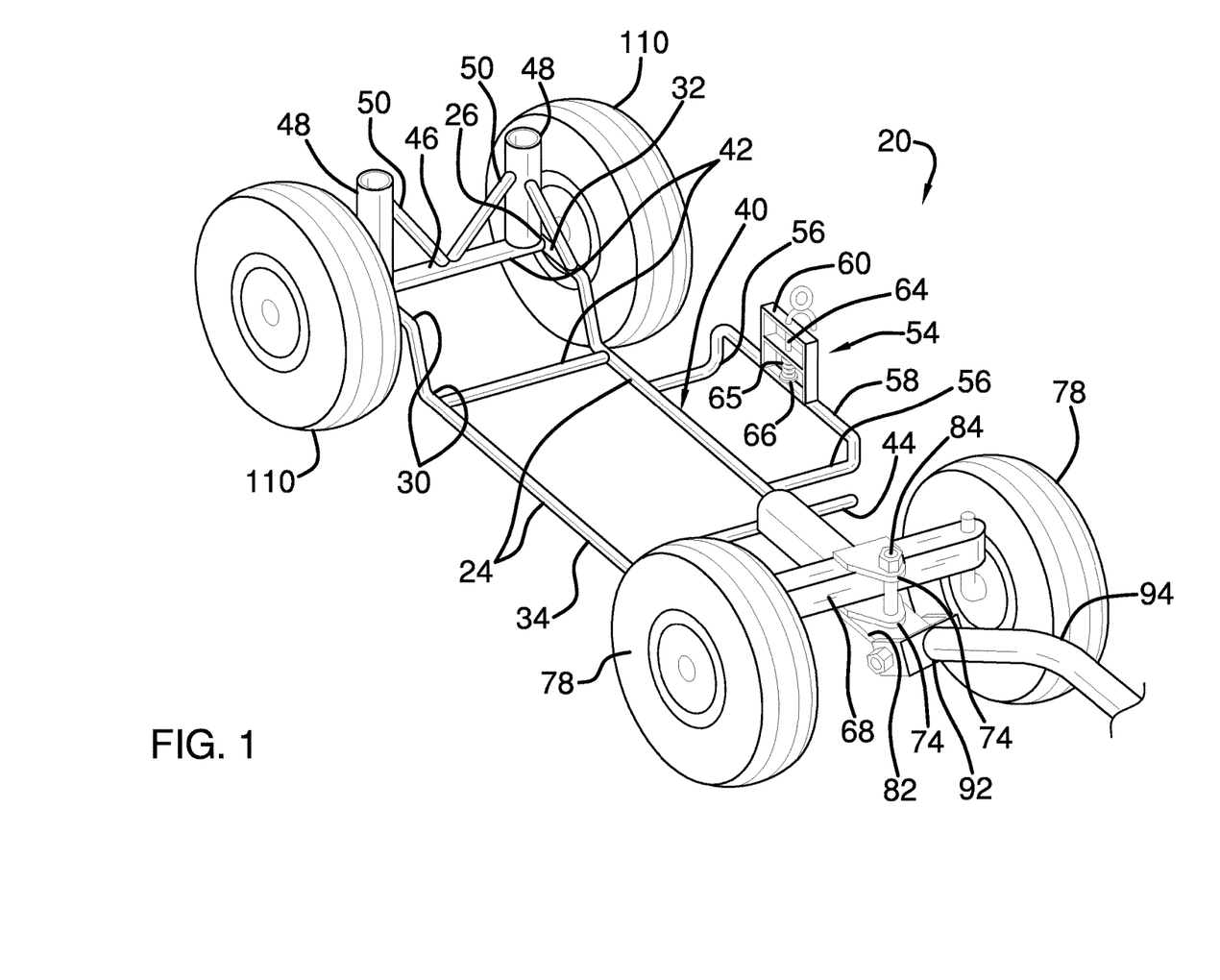
FIG. 1 is a perspective view of a tamper cart system according to an embodiment of the disclosure.
Figure 2:
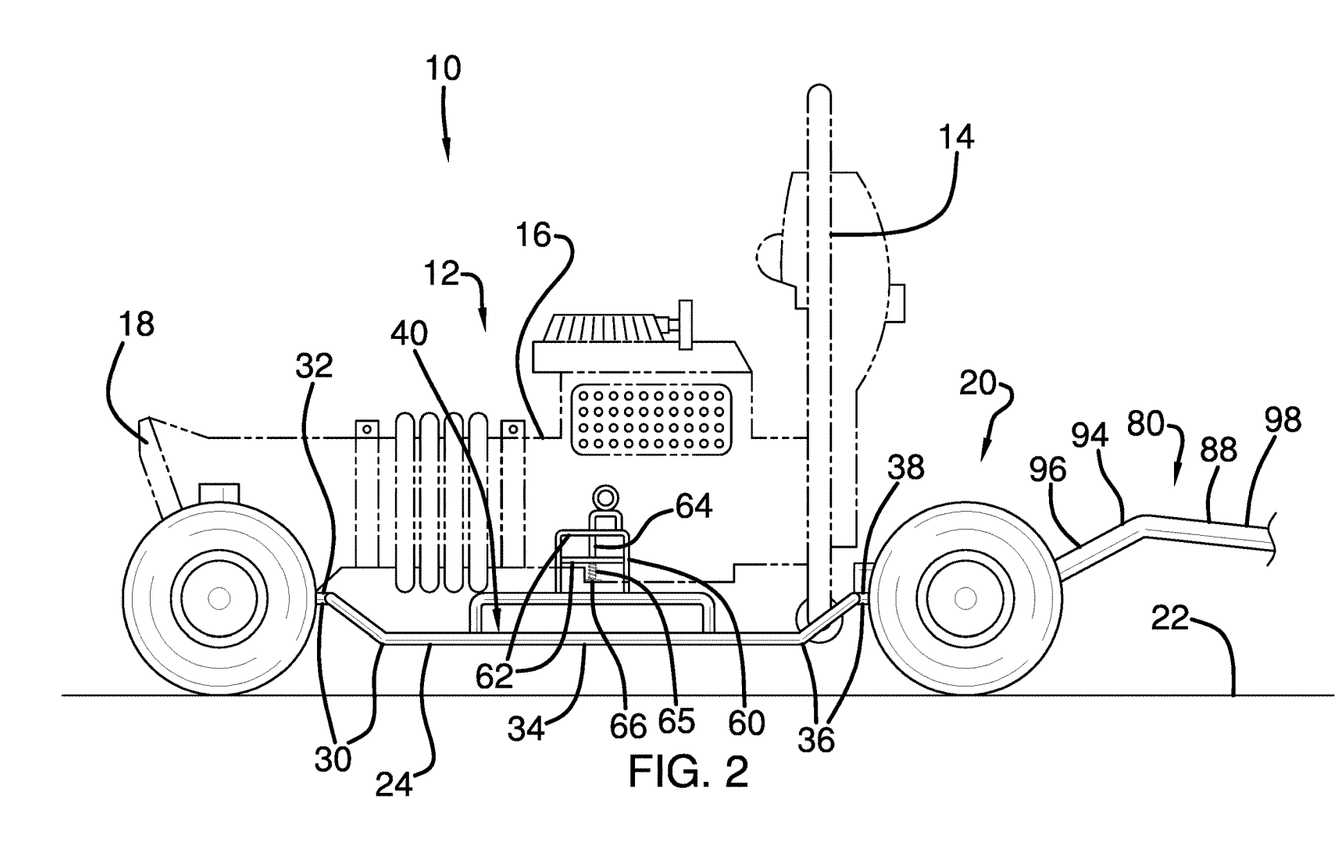
FIG. 2 is a perspective in-use view of an embodiment of the disclosure.
Figure 3:
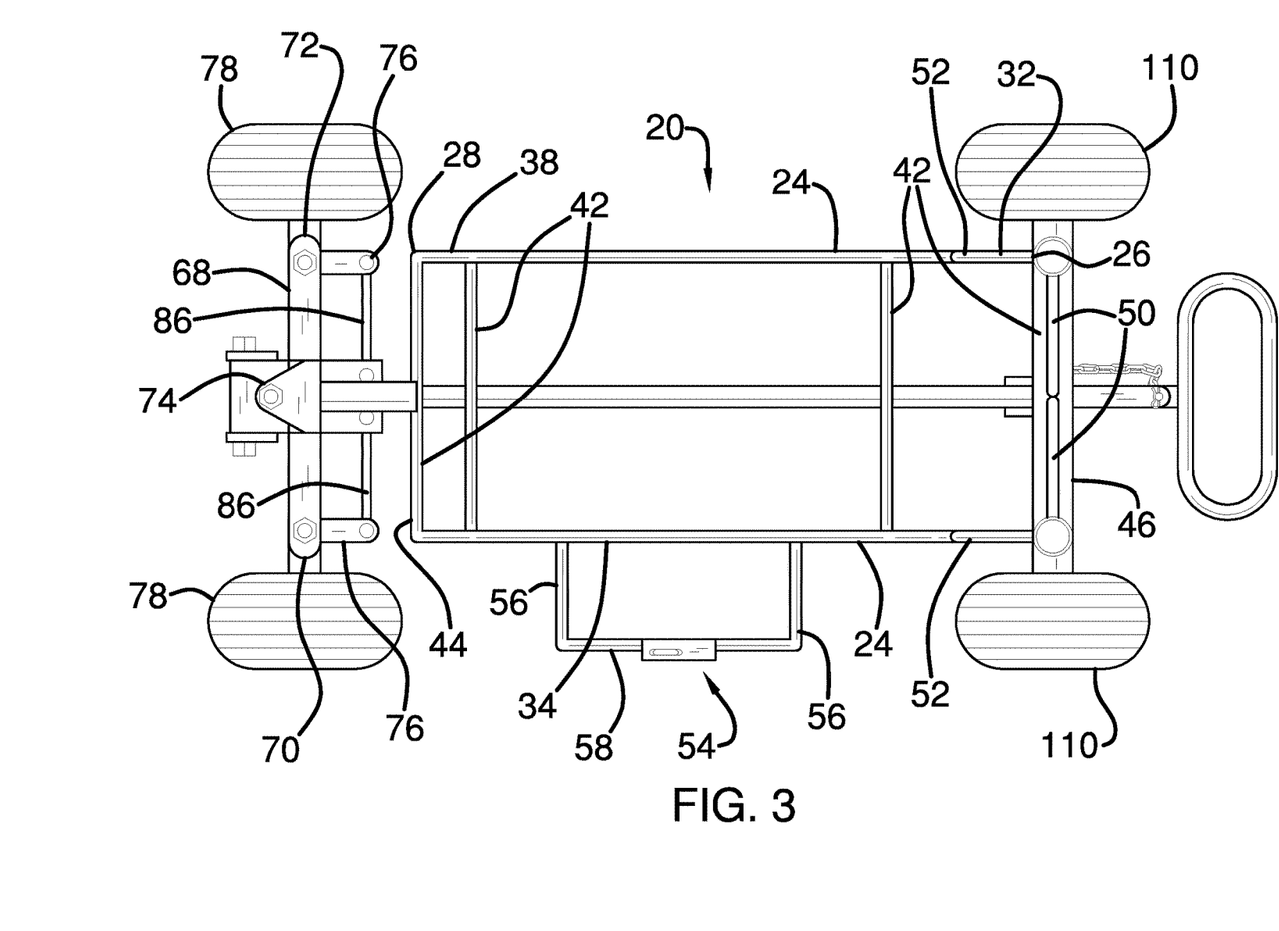
FIG. 3 is a top view of an embodiment of the disclosure.
Figure 4:
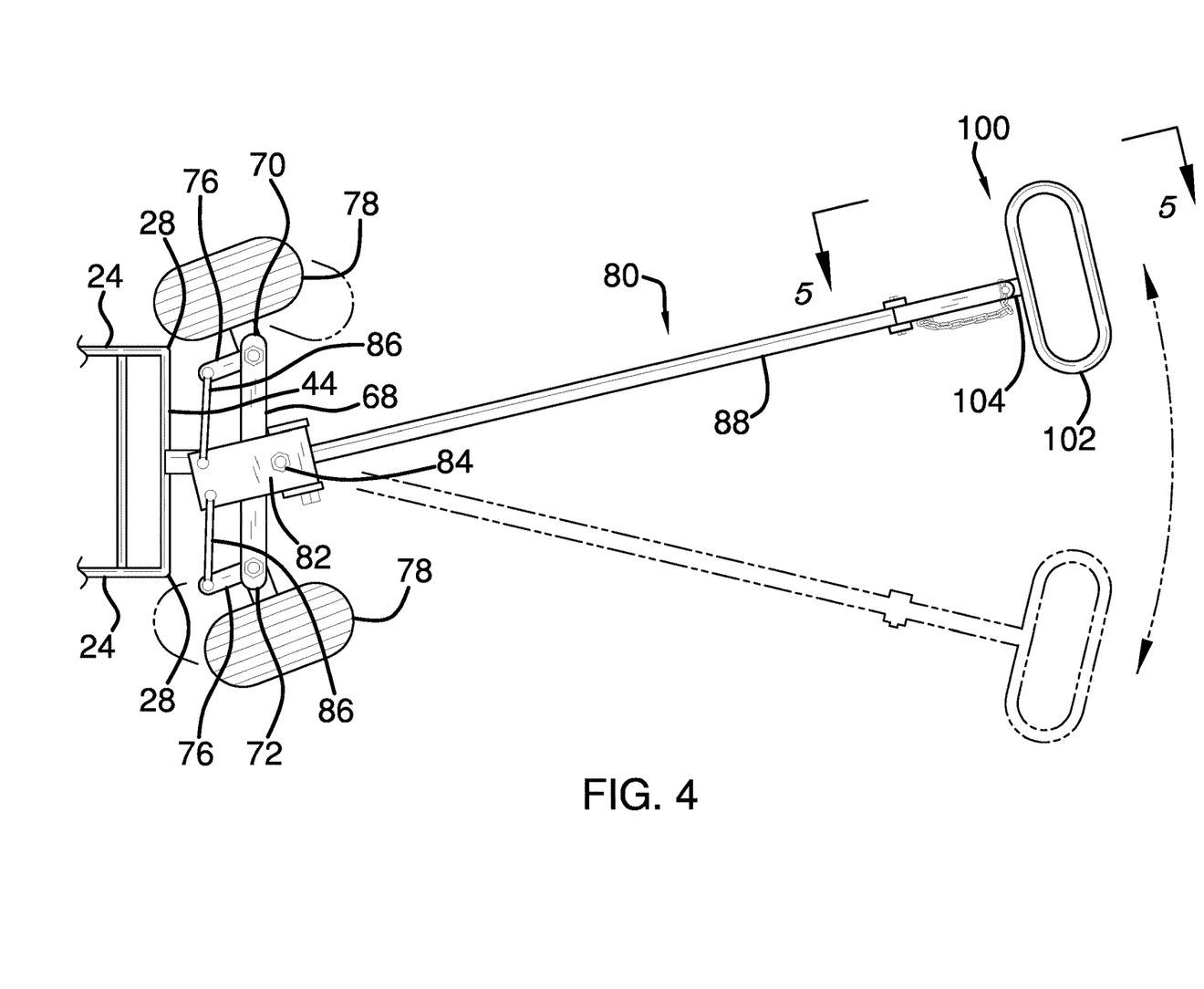
FIG. 4 is a bottom view of an embodiment of the disclosure.
Figure 5:
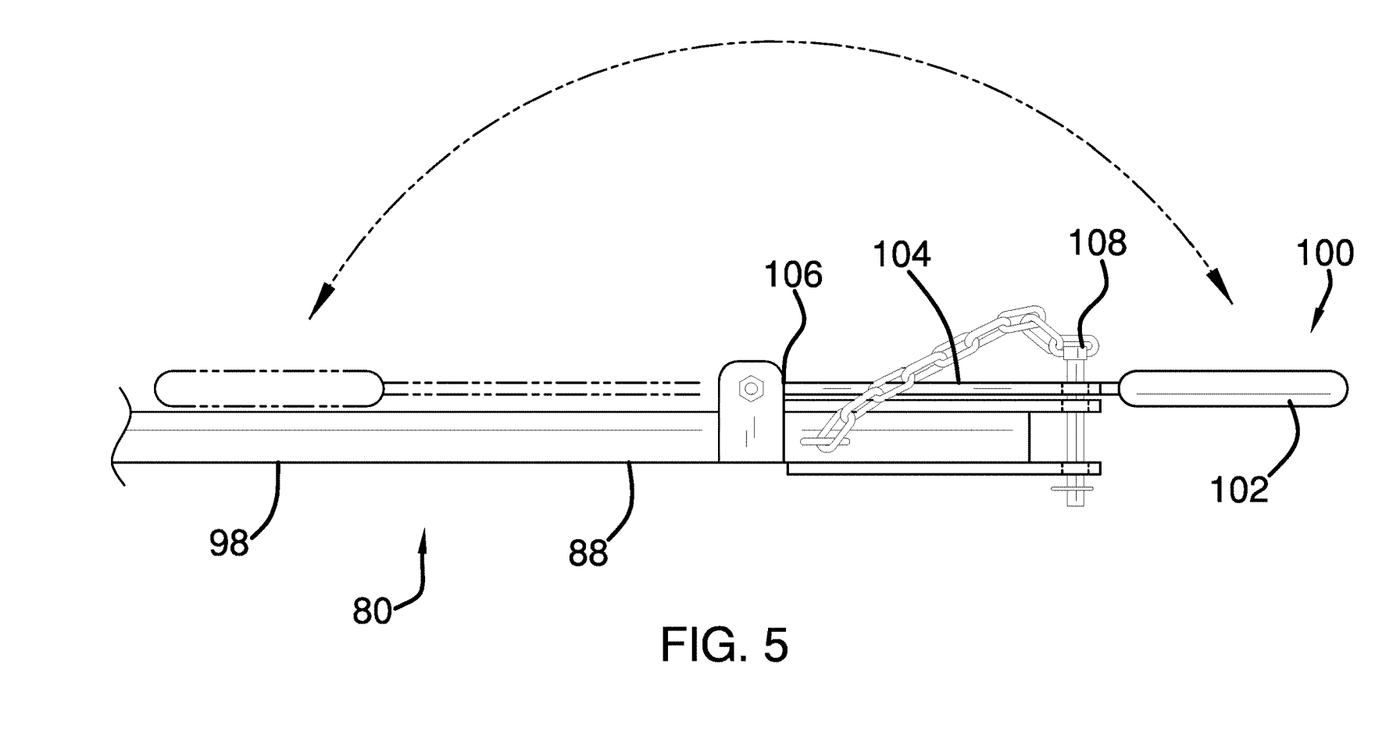
FIG. 5 is a right side view of a grip of embodiment of the disclosure.

With reference now to the drawings, and in particular to FIGS. 1 through 5 thereof, a new cart device embodying the principles and concepts of an embodiment of the disclosure and generally designated by the reference numeral 10 will be described.

As best illustrated in FIGS. 1 through 5, the tamper cart system 10 generally comprises a mechanical tamper 12. The mechanical tamper 12 has a handle 14, a body 16 and a compression plate 18. The mechanical tamper 12 may be a jumping jack tamper or the like. A cart 20 is provided and the cart 20 may be rolled along a support surface 22. The support surface 22 may be ground. The mechanical tamper 12 is selectively positioned on the cart 20 such that the mechanical tamper 12 is transportable by an individual.

The cart 20 comprises a pair of first members 24. Each of the first members 24 has a first end 26 and a second end 28. Each of the first members 24 has a pair of first bends 30. The first bends 30 are congruent with each other. Thus, the first bends 30 define a first raised portion 32 and with respect to a central portion 34. The first raised portion 32 is positioned closer to the first end 26 than the second end 28.

Each of the first members 24 has a pair of second bends 36. The second bends 36 are congruent with each other. Thus, the second bends 36 define a second raised portion 38 with respect to the central portion 34. The second raised portion 38 is positioned closer to the second end 28 than the first end 26 such that each of the first members 24 defines a saddle 40. The mechanical tamper 12 is positioned in the saddle 40. The body 16 of the mechanical tamper 12 rests on the central portion 34 corresponding to each of the first members 24. Each of the first members 24 has a length ranging between ninety cm and ninety six cm.

A plurality of second members 42 is provided and each of the second members 42 is coupled between the pair of first members 24. The second members 42 are spaced apart from each other and are distributed along the first members 24. Moreover, the plurality of second members 42 includes a front member 44 and a rear member 46. The front member 44 is aligned with the second end 28 of the first members 24. The rear member 46 is aligned with the first end 26 of the first members 24. Each of the second members 42 has a length ranging between twenty five cm and thirty cm.

A pair of tubes 48 is provided. Each of the tubes 48 is coupled to and extends upwardly from the rear member 46. Moreover, each of the tubes 48 may insertably receive a handle of a hand tamper. The tubes 48 are spaced apart from each other.

A pair of first supports 50 is provided. Each of the first supports 50 is coupled between an associated one of the tubes 48 and the rear member 46. Each of the first supports 50 intersects on the rear member 46 such that the pair of first supports 50 forms a V-shape. The compression plate 18 on the mechanical tamper 12 is positioned on the pair of first supports 50 when the mechanical tamper 12 is positioned on the cart 20. Thus, the first supports 50 inhibit the mechanical tamper 12 from rolling on the cart 20. A pair of second supports 52 is provided. Each of the second supports 52 is coupled between an associated one of the tubes 48 and an associated one of the first members 24.

A locking unit 54 is provided. The locking unit 54 is coupled to the cart 20 and the locking unit 54 is selectively manipulated. The locking unit 54 engages the mechanical tamper 12 when the mechanical tamper 12 is positioned on the cart 20. Thus, the locking unit 54 retains the mechanical tamper 12 on the cart 20.

The locking unit 54 comprises a pair of primary members 56. Each of the primary members 56 is coupled to and extends laterally away from an associated one of the first members 24. The primary members 56 are spaced apart from each other. A secondary member 58 extends between the primary members 56. The secondary member 58 is spaced from the associated first member 24. The secondary member 58 has a length ranging between fifty cm and fifty five cm.

A frame 60 is coupled to and extends upwardly from the secondary member 58. The frame 60 has a pair of horizontal sections 62. Each of the horizontal sections 62 is spaced from the secondary member 58. A rod 64 slidably extends through each of the horizontal sections 62. The rod 64 has a bottom end 66.

A biasing member 65 is positioned around the rod 64. The biasing member 65 extends between an associated one of the horizontal sections 62 and the bottom end 66 of the rod 64. Moreover, the biasing member 65 biases the bottom end 66 to engage the secondary member 58. The rod 64 engages the mechanical tamper 12 such that the mechanical tamper 12 is inhibited from falling off of the cart 20.

A front axle 68 is provided that has a first end 70 and a second end 72. The front axle 68 is coupled to the front member 44. A pair of tabs 74 is coupled to and extends forwardly away from the front axle 68. The tabs 74 are spaced apart from each other.

A pair of control arms 76 is provided. Each of the control arms 76 is rotatably coupled to an associated one of the first end 70 and the second end 72 of the front axle 68. Each of the control arms 76 is rotatable about a vertical axis extending through the front axle 68. A pair of front wheels 78 is provided. Each of the front wheels 78 is rotatably coupled to an associated one of the control arms 76.

A handle 80 is movably coupled to the cart 20 and the handle 80 may be manipulated. The handle 80 comprises a plate 82 that is rotatably coupled to the tabs 74 on the front axle 68. A first pin 84 extends through the plate 82 and the tabs 74. Thus, the plate 82 is rotatably coupled to the tabs 74. The plate 82 is rotatable about the vertical axis extending through the front axle 68.

A pair of steering rods 86 is provided. Each of the steering rods 86 is coupled between the plate 82 and an associated one of the control arms 76. Thus, each of the front wheels 78 steers when the plate 82 is rotated on the first pin 84.

A pole 88 is provided that has a leading end 90 and a following end 92. The following end 92 is hingedly coupled to the plate 82. The pole 88 has a bend 94 thereon. The bend 94 on the pole 88 is positioned closer to the following end 92 than the leading end 90. Moreover, the bend 94 on the pole 88 defines a first portion 96 forming and angle with a second portion 98. The first portion 96 extends upwardly from the front axle 68. The second portion 98 extends forwardly from the front axle 68. The following end 92 may be gripped thereby facilitating the cart 20 to be towed.

A grip 100 is provided. The grip 100 includes a closed loop 102 and a stem 104 coupled to and extending away from the closed loop 102. The stem 104 has a distal end 106 with respect to the closed loop 102. The distal end 106 of the stem 104 is hingedly coupled to the second portion 98 of the pole 88.

The grip 100 is selectively positioned in a deployed position having the closed loop 102 being spaced from the leading end 90 of the rod 64. Thus, the closed loop 102 may be gripped. The grip 100 is selectively positioned in a folded position. Thus, the closed loop 102 is positioned on the second portion of the rod 64.

A second pin 108 is provided and the second pin 108 may be manipulated. The second pin 108 removably extends through the stem 104 and engages the second portion of the rod 64 when the grip 100 is in the deployed position. Thus, the second pin 108 retains the grip 100 in the deployed position. A pair of rear wheels 110 is provided. Each of the rear wheels 110 is rotatably coupled to the rear member 46 and each of the rear wheels 110 may roll along the support surface 22.

In use, the mechanical tamper 12 is stood on the compression plate 18. The cart 20 is parked such that the rear member 46 abuts the mechanical tamper 12. The mechanical tamper 12 is tipped onto the cart 20. The locking unit 54 is manipulated to engage the mechanical tamper 12. The handle 80 is gripped and the mechanical tamper 12 is transported on the cart 20. Thus, the mechanical tamper 12 is transported by an individual.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A tamper cart system comprising:
   a mechanical tamper having a handle, a body and a compression plate; and
   a cart being configured to be rolled along a support surface, said mechanical tamper being selectively positioned on said cart such that said mechanical tamper is transportable by an individual;
   a handle being movably coupled to said cart wherein said handle is configured to be manipulated; and
   a locking unit being coupled to said cart wherein said locking unit is configured to be manipulated, said locking unit engaging said mechanical tamper when said mechanical tamper is positioned on said cart such that said locking unit retains said mechanical tamper on said cart.

2. The system according to claim 1, wherein said cart comprises a pair of first members, each of said first members having a first end and a second end, each of said first members having a pair of first bends, said first bends being congruent with each other such that said first bends define a first raised portion and with respect to a central portion, said first raised portion being positioned closer to said first end than said second end.

3. The system according to claim 2, further comprising:
a plurality of second members, each of said second members being coupled between said pair of first members, said second members being spaced apart from each other and being distributed along said first members; and
said plurality of second members includes a front member and a rear member, said front member being aligned with said second end of said first members, said rear member being aligned with said first end of said first members.

4. The system according to claim 3, further comprising a pair of tubes, each of said tubes being coupled to and extending upwardly from said rear member wherein each of said tubes is configured to insertably receive a handle of a hand tamper, said tubes being spaced apart from each other.

5. The system according to claim 4, further comprising a pair of first supports, each of said first supports being coupled between an associated one of said tubes and said rear member, each of said first supports intersecting on said rear member such that said pair of first supports forms a V-shape, said compression plate being positioned on said pair of first supports when said mechanical tamper is positioned on said cart such that said first supports inhibits said mechanical tamper from rolling on said cart.

6. The system according to claim 4, further comprising a pair of second supports, each of said second supports being coupled between an associated one of said tubes and an associated one of said first members.

7. The system according to claim 3, further comprising a pair of rear wheels, each of said rear wheels being rotatably coupled to said rear member wherein each of said rear wheels is configured to roll along the support surface.

8. The system according to claim 1, wherein said locking unit comprising:
a pair of primary members, each of said primary members being coupled to and extending laterally away from an associated one of said first members, said primary members being spaced apart from each other;
a secondary member extending between said primary members, said secondary member being spaced from said associated first member;
a frame being coupled to and extending upwardly from said secondary member, said frame having a pair of horizontal sections, each of said horizontal sections being spaced from said secondary member;
a rod slidably extending through each of said horizontal sections, said rod having a bottom end; and
a biasing member being positioned around said rod, said biasing member extending between an associated one of said horizontal sections and said bottom end of said rod, said biasing member biasing said bottom end to engage said secondary member, said rod engaging said mechanical tamper such that said mechanical tamper is inhibited from falling off of said cart.

9. The system of claim 1, further comprising:
said cart comprising:
a pair of first members, each of said first members having a first end and a second end, each of said first members having a pair of first bends, said first bends being congruent with each other such that said first bends define a first raised portion and with respect to a central portion, said first raised portion being positioned closer to said first end than said second end, each of said first members having a pair of second bends, said second bends being congruent with each other such that said second bends define a second raised portion with respect to said central portion, said second raised portion being positioned closer to said second end than said first end such that each of said first members defines a saddle, said mechanical tamper being positioned in said saddle having said body resting on said central portion corresponding to each of said first members,
a plurality of second members, each of said second members being coupled between said pair of first members, said second members being spaced apart from each other and being distributed along said first members, said plurality of second members including a front member and a rear member, said front member being aligned with said second end of said first members, said rear member being aligned with said first end of said first members,
a pair of tubes, each of said tubes being coupled to and extending upwardly from said rear member wherein each of said tubes is configured to insertably receive a handle of a hand tamper, said tubes being spaced apart from each other,
a pair of first supports, each of said first supports being coupled between an associated one of said tubes and said rear member, each of said first supports intersecting on said rear member such that said pair of first supports forms a V-shape, said plate being positioned on said pair of first supports when said mechanical tamper is positioned on said cart such that said first supports inhibits said mechanical tamper from rolling on said cart,
a pair of second supports, each of said second supports being coupled between an associated one of said tubes and an associated one of said first members,
said locking unit comprising:
a pair of primary members, each of said primary members being coupled to and extending laterally away from an associated one of said first members, said primary members being spaced apart from each other,
a secondary member extending between said primary members, said secondary member being spaced from said associated first member, and
a frame being coupled to and extending upwardly from said secondary member, said frame having a pair of horizontal sections, each of said horizontal sections being spaced from said secondary member,
a rod slidably extending through each of said horizontal sections, said rod having a bottom end, and
a biasing member being positioned around said rod, said biasing member extending between an associated one of said horizontal sections and said bottom end of said rod, said biasing member biasing said bottom end to engage said secondary member, said rod engaging said mechanical tamper such that said mechanical tamper is inhibited from falling off of said cart;
a front axle having a first end and a second end, said front axle being coupled to said front member,
a pair of tabs, each of said tabs being coupled to and extending forwardly away from said front axle, said tabs being spaced apart from each other,
a pair of control arms, each of said control arms being rotatably coupled to an associated one of said first end and said second end of said front axle,
a pair of front wheels, each of said front wheels being rotatably coupled to an associated one of said control arms,
said handle comprising:
a plate being rotatably coupled to said tabs on said front axle,
a first pin extending through said plate and said tabs such that said plate is rotatably coupled to said tabs,
a pair of steering rods, each of said steering rods being coupled between said plate and an associated one of said control arms such that each of said front wheels steers when said plate is rotated on said first pin,
a pole having a leading end and a following end, said following end being hingedly coupled to said plate, said pole having a bend thereon, said bend on said pole being positioned closer to said following end than said leading end to define a first portion forming and angle with a second portion wherein said following end is configured to be gripped thereby facilitating said cart to be towed,
a grip having a closed loop and a stem being coupled to and extending away from said closed loop, said stem having a distal end with respect to said closed loop, said distal end of said stem being hingedly coupled to said second portion of said pole, said grip being positioned in a deployed position having said closed loop being spaced from said leading end of said pole wherein said closed loop is configured to be gripped, said grip being positioned in a folded position having said closed loop being positioned on said second portion of said pole, and
a pin being configured to be manipulated, said pin removably extending through said stem and engaging said second portion of said pole when said grip is in said deployed position such that said pin retains said grip in said deployed position; and
a pair of rear wheels, each of said rear wheels being rotatably coupled to said rear member wherein each of said rear wheels is configured to roll along the support surface.

10. A tamper cart system comprising:
a mechanical tamper having a handle, a body and a compression plate; and
a cart being configured to be rolled along a support surface, said mechanical tamper being selectively positioned on said cart such that said mechanical tamper is transportable by an individual;
a handle being movably coupled to said cart wherein said handle is configured to be manipulated;
a front member;
a front axle having a first end and a second end, said front axle being coupled to said front member;
a pair of tabs, each of said tabs being coupled to and extending forwardly away from said front axle, said tabs being spaced apart from each other;
a pair of control arms, each of said control arms being rotatably coupled to an associated one of said first end and said second end of said front axle; and
a pair of front wheels, each of said front wheels being rotatably coupled to an associated one of said control arms.

11. The system according to claim 10, wherein said handle comprises:
a plate being rotatably coupled to said tabs on said front axle; and
a first pin extending through said plate and said tabs such that said plate is rotatably coupled to said tabs.

12. The system according to claim 11, further comprising a pair of steering rods, each of said steering rods being coupled between said plate and an associated one of said control arms such that each of said front wheels steers when said plate is rotated on said first pin.

13. The system according to claim 11, further comprising a pole having a leading end and a following end, said following end being hingedly coupled to said plate, said pole having a bend thereon, said bend on said pole being positioned closer to said following end than said leading end to define a first portion forming and angle with a second portion wherein said following end is configured to be gripped thereby facilitating said cart to be towed.

14. The system according to claim 13, further comprising a grip having a closed loop and a stem being coupled to and extending away from said closed loop, said stem having a distal end with respect to said closed loop, said distal end of said stem being hingedly coupled to said second portion of said pole.

15. The system according to claim 14, further comprising:
said grip being positioned in a deployed position having said closed loop being spaced from said leading end of said rod wherein said closed loop is configured to be gripped, said grip being positioned in a folded position having said closed loop being positioned on said second portion of said pole; and
a pin being configured to be manipulated, said pin removably extending through said stem and engaging said second portion of said pole when said grip is in said deployed position such that said pin retains said grip in said deployed position.

16. A tamper cart system comprising:
a mechanical tamper having a handle, a body and a compression plate; and
a cart being configured to be rolled along a support surface, said mechanical tamper being selectively positioned on said cart such that said mechanical tamper is transportable by an individual;
a handle being movably coupled to said cart wherein said handle is configured to be manipulated;
wherein said cart comprises a pair of first members, each of said first members having a first end and a second end, each of said first members having a pair of first bends, said first bends being congruent with each other such that said first bends define a first raised portion and with respect to a central portion, said first raised portion being positioned closer to said first end than said second end; and
wherein each of said first members has a pair of second bends, said second bends being congruent with each other such that said second bends define a second raised portion with respect to said central portion, said second raised portion being positioned closer to said second end than said first end such that each of said first members defines a saddle, said mechanical tamper being positioned in said saddle having said body resting on said central portion corresponding to each of said first members.

\* \* \* \* \*